J. H. HAND.
RUNNING GEAR FOR VEHICLES.
APPLICATION FILED JULY 8, 1908.
909,086.
Patented Jan. 5, 1909.
2 SHEETS—SHEET 2.
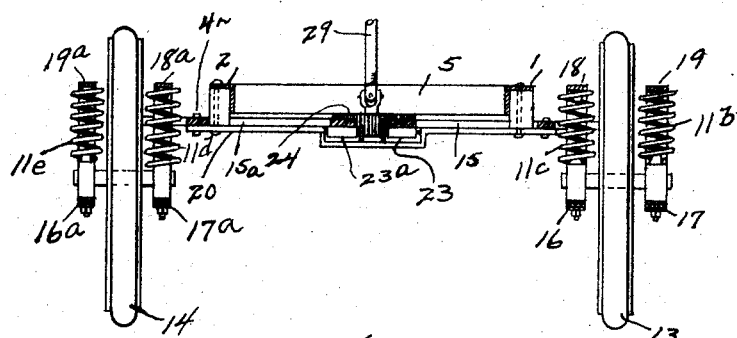
Fig. 3.
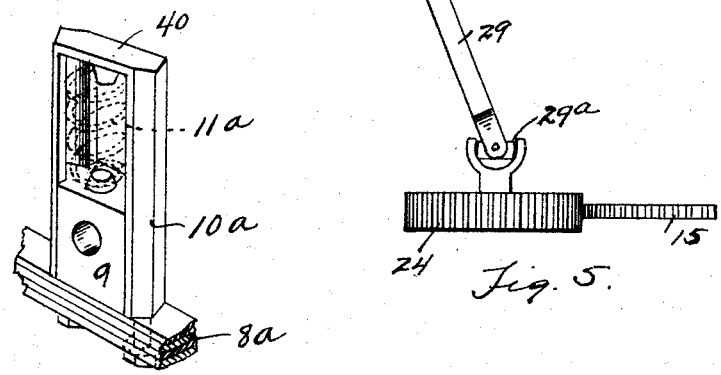
Fig. 4.
Fig. 5.
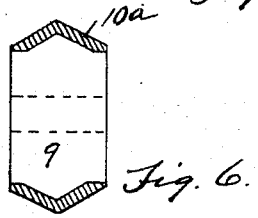
Fig. 6.
Witnesses:
Chas E. Wiener
Harry T. Parks
Jesse H. Hand
Inventor
By his Attorneys Parker & Burton

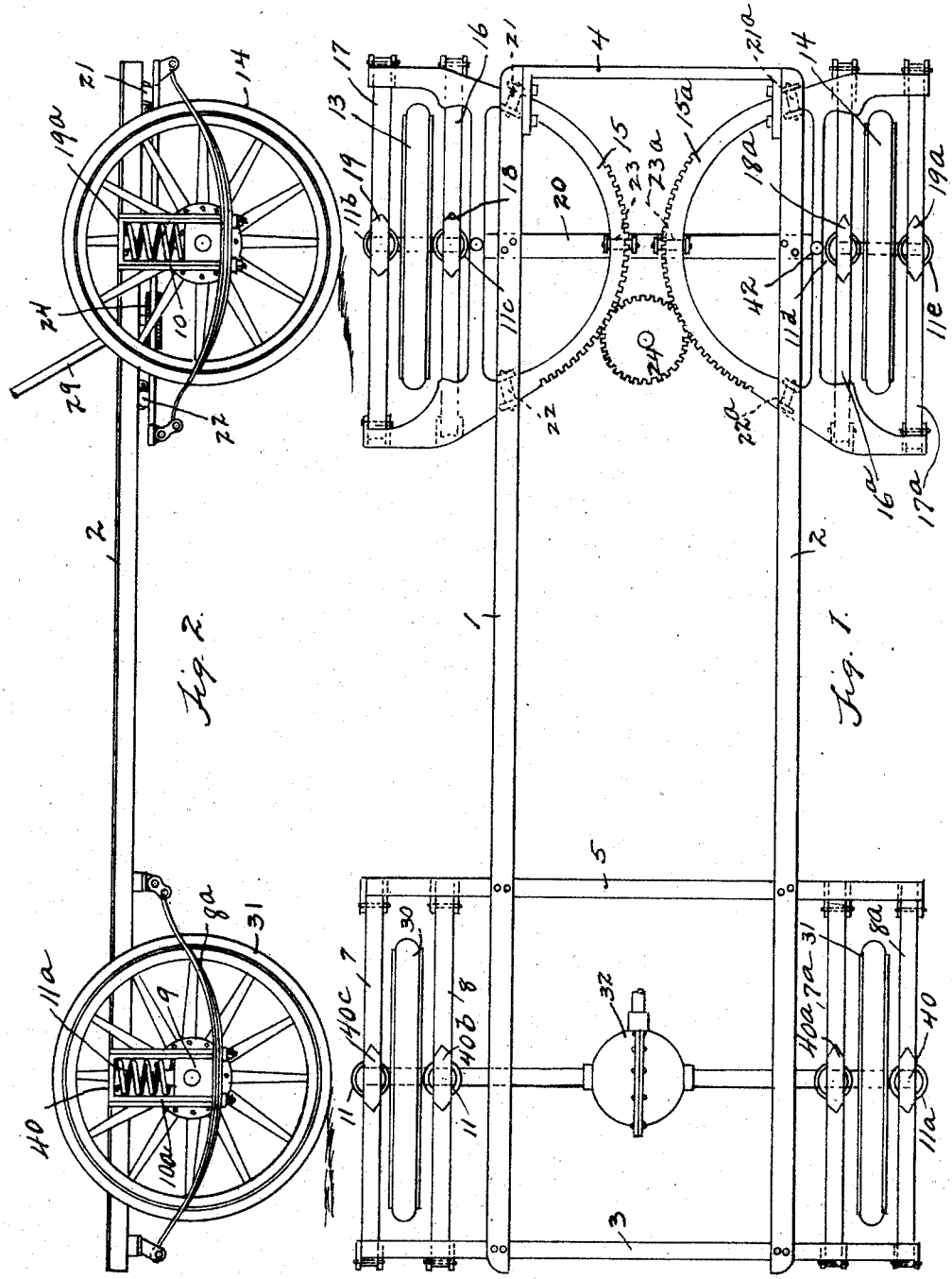

UNITED STATES PATENT OFFICE.

JESSE H. HAND, OF ANN ARBOR, MICHIGAN, ASSIGNOR OF ONE-FOURTH TO FRANK I. CORNWELL, OF ANN ARBOR, MICHIGAN.

RUNNING-GEAR FOR VEHICLES.

No. 909,086.   Specification of Letters Patent.   Patented Jan. 5, 1909.

Application filed July 8, 1908. Serial No. 442,447.

*To all whom it may concern:*

Be it known that I, JESSE H. HAND, a citizen of the United States, residing at Ann Arbor, county of Washtenaw, State of Michigan, have invented a certain new and useful Improvement in Running-Gear for Vehicles, and declare the following to be a full, clear, and exact description of the same, such as will enable others skilled in the art to which it pertains to make and use the same, reference being had to the accompanying drawings, which form a part of this specification.

This invention relates to running gear for vehicles.

It has for its object an improved means of suspending the vehicle running gear on the wheels, an improved means of mounting the wheels to enable the vehicle running gear to be turned or guided.

In the drawings:—Figure 1, is a plan view. Fig. 2, is a side elevation. Fig. 3, is a cross section through the vehicle frame. Fig. 4, is a perspective of the axle box housing. Fig. 5, is a perspective of the connection between the steer-post and the steering bars. Fig. 6, is a cross section of the axle box housing.

The main frame is rectangular and rigid; at the front are two pivoted sub-frames, at the rear a single sub-frame rigidly connected to the main frame.

1 and 2 indicate the longitudinal side bars of the main frame.

3 and 4 indicate the cross members at the rear and front ends respectively. At the rear the cross member 3 is extended on each side beyond the bars 1 and 2 and is supplemented by cross members 5, which extend equally with cross member 3. The projecting ends of cross members 3 and 5 support spring bars made in the form of half elliptic springs 16 and 17 on the left side and $16^a$ and $17^a$ on the right side, which are suspended by shackles and brackets, from which rise the axle box housings 18 and 19 on the left hand and $18^a$ and $19^a$ on the right hand. On the right side at the rear of the main frame spring members $7^a$ and $8^a$ support a vertical guide $10^a$, between whose upright members engages a sliding axle bearing 9. Between the upper side of the axle bearing 9 and the cross bar 40 which unites the uprights is a spiral spring $11^a$; in the axle bearing 9, and its companion bearing which is supported by the cross bar $40^a$, is the axle of the rear right wheel 31. A similar suspended spring framework, comprising the spring bars 7, 8, with parallel upright guides and cross bars $40^b$, $40^c$, support the bearings for the axle of wheel 30.

At the front end the right hand wheel 14 is journaled in axle boxes which are supported by side springs $16^a$, $17^a$; these springs are suspended by brackets and shackles from a sub-frame whose main member, $15^a$, is arched around the pivot 42 as a center; the axle of wheel 14 is short, and the entire frame which supports the wheel is adapted to change its angular relation to the main frame. The wheel 13 at the left front of the frame is supported in a similar pivoted sub-frame through the medium of the side springs 16 and 17. The cross bars of the axle box housings of both front wheels are seen in Figs. 2 and 3 at $11^b$, $11^c$, $11^d$, and $11^e$, and the housing 10 of the wheel 14 is seen in elevation in Fig. 2. The arched members 15, $15^a$ of the two sub-frames at the front of the vehicle are provided with rack segments and mesh with a pinion 24. The pinion is actuated by post 29 with which it is connected by a universal joint $29^a$. The sub-frames at the front swing under the main frame against which they bear with interposed antifriction rollers. $21^a$, $22^a$, indicate the rollers over the right hand frame and 21 and 22 those over the left hand frame; they swing over the cross bar member 20 with interposed antifriction rollers $23^a$ and 23.

At the center of the rear axle 9 is shown the gear housing 32 within which the actuation due to the rotation of the main shaft of the engine is communicated to the axle 9, which is the driving axle.

What I claim is:—

1. A vehicle running gear, having in combination a rigid rectangular frame, a sub-frame for each wheel, journal bearings for each wheel at both sides thereof, said independent journal bearings being mounted on independent spring suspension devices.

2. In a vehicle running gear, in combination with a rigid rectangular frame, a sub-frame pivotally connected therewith, a wheel having independent journal bearings at each side thereof mounted in said sub-frame, and independent spring supports for each journal bearing, substantially as described.

3. In a vehicle running gear, in combination with a main frame, a pair of sub-frames independently pivotally connected to said main frame, journal bearings supported by each of said sub-frames on each side thereof, independent spring suspension members therefor, a wheel supported by each pair of said journal bearings, and means for simultaneously oscillating the sub-frames, substantially as described.

In testimony whereof, I sign this specification in the presence of two witnesses.

JESSE H. HAND.

Witnesses:
 CHARLES F. BURTON,
 WILLIAM M. SWAN.